Nov. 8, 1966      R. T. CORNELIUS      3,283,947
BOTTLE CARRIER
Filed June 2, 1965                                                   2 Sheets-Sheet 2
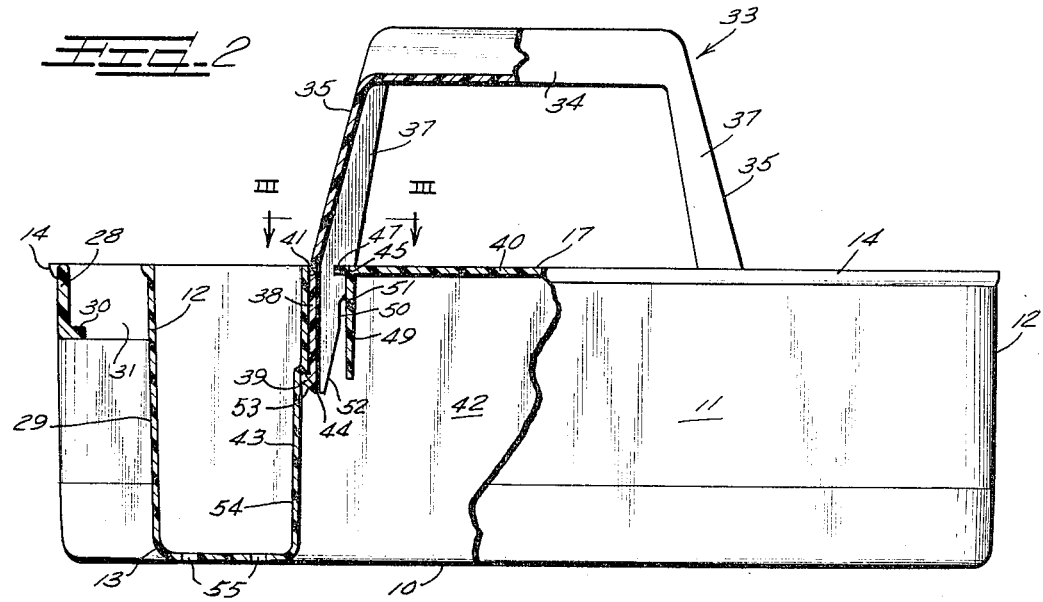
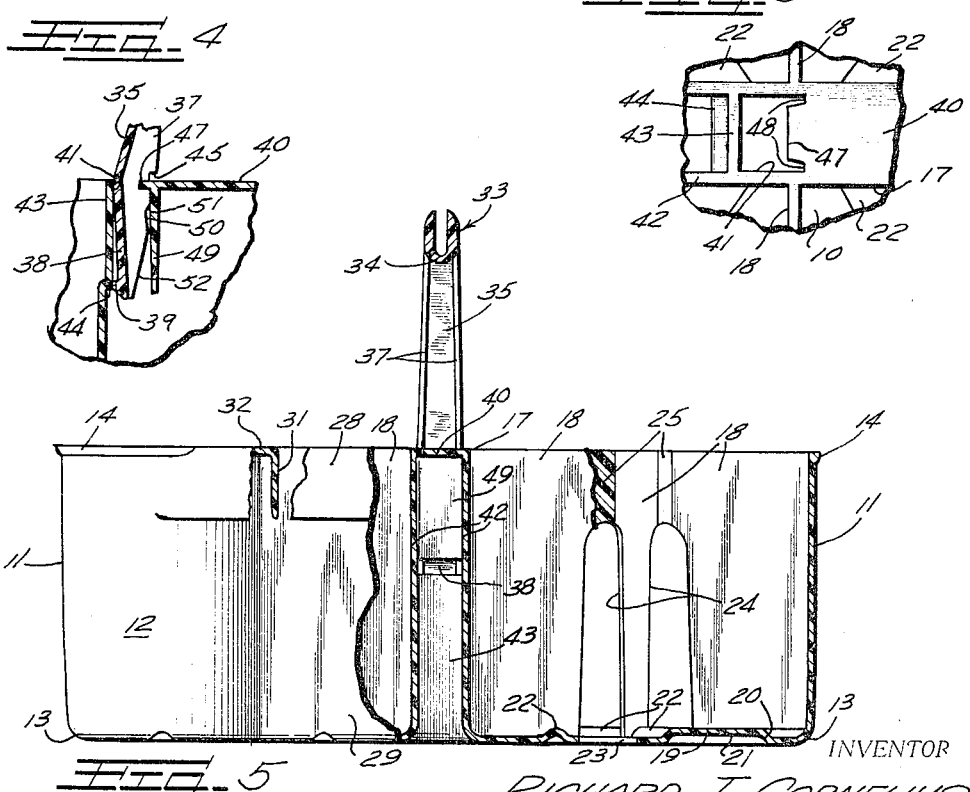
INVENTOR
RICHARD T. CORNELIUS
BY
ATTORNEYS

United States Patent Office 3,283,947
Patented Nov. 8, 1966

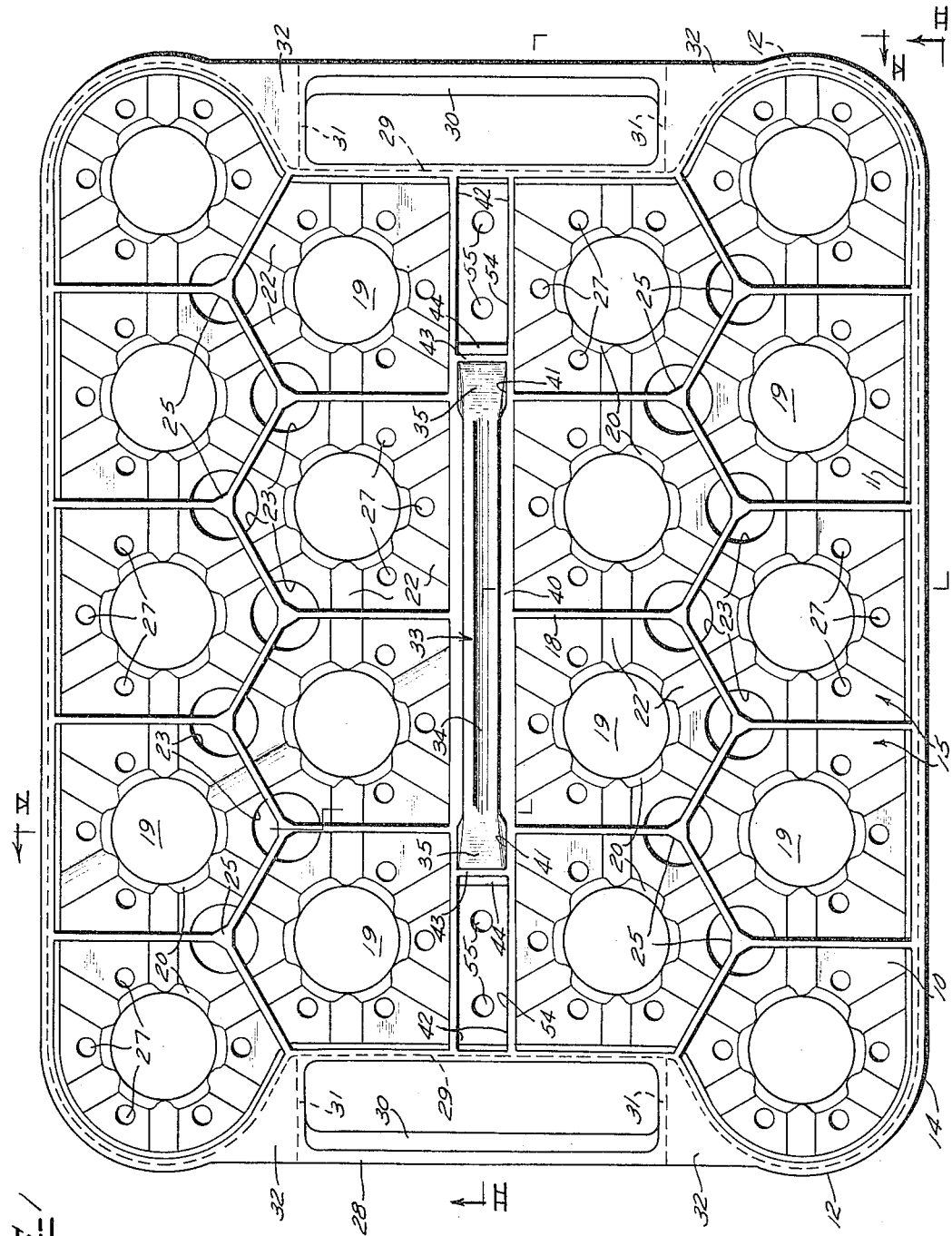

3,283,947
BOTTLE CARRIER
Richard T. Cornelius, Minneapolis, Minn., assignor to
The Cornelius Company, Anoka, Minn., a corporation
of Minnesota
Filed June 2, 1965, Ser. No. 460,786
14 Claims. (Cl. 220—102)

This invention relates to improvements in bottle carriers or cases which are especially adapted for handling, transporting and storing crown-capped beverage bottles of the six to ten ounce size, and is more particularly concerned with carriers of this type especially adapted to be molded from suitable plastic material such as high density polyethylene.

Bottle-carrying cases have heretofore conventionally been made at least largely from wood, or wooden trays having been provided in which paper carriers of convenient capacity for retail trade have been packed for store delivery. However, many advantages are gained from constructing bottle carriers or case from moldable synthetic plastic material such as high density polyethylene. Among such advantages may be mentioned lighter weight as compared with wood, lack of water absorption, easy cleaning, great durability, and substantial latitude and adaptability in shaping and configuration enabling handling of a larger number of bottles in a more compact space. Several of these advantages are also apparent in contrast to the paper carriers.

Many prior attempts to produce carrying cases from molded plastic materials have encountered excessive production costs due, at least in part, to difficulties in attaining the desired configurations which have necessitated numerous die parts including slides and the like, and resulting in slow output.

For the bulk purchase, self-service market, the physical limits of paper carriers to withstand load and conditions of service use and abuse have restricted the total number of filled beverage bottles which may safely be entrusted to any such carrier, six- and eight-packs having been the general rule in the trade. On the other hand, since purchasers will usually buy the entire contents in a carrier, the greater the capacity of the carrier the greater each unit sale. In other words, where a purchaser may buy one or two six or eight-packs, the same purchaser will buy one or two carriers units having a significantly larger total number of bottles.

It is, therefore, a prime object of the present invention to provide a new and improved bottle-carrier structure of molded plastic construction, which will serve directly as a bulk retail sales bottle-pack avoiding the need for carrying trays to transport the same to the retail outlet, and which affords a sales unit of larger volume than possible with paper carriers, but is nevertheless of convenient size and loaded weight to cater to self-service bulk purchasers.

Another object of the invention is to provide a new and improved bottle carrier which is constructed and arranged to be molded from suitable plastic, utilizing minimum material and especially devised for high speed, economical production between a pair of mating separable forming dies, entirely eliminating any need for slides or other auxiliary die parts in forming any structural feature of the carrier unit.

A further object of the invention is to provide a new and improved molded bottle-carrier structure constructed and arranged for conveniently carrying a load of eighteen crown capped filled beverage bottles and having handle means for one hand carrying of the unit.

Still another object of the invention is to provide a new and improved molded plastic bottle carrier which has novel central handle structure thereon.

Yet another object of the invention is to provide a new and improved molded plastic bottle carrier and separately attachable handle.

A still further object of the invention is to provide a new and improved molded plastic bottle carrier having both integral and attachable handles and which may be used with or without the attachable handle.

It is also an object of the invention to provide new and improved means for securing a molded plastic handle to a molded plastic bottle carrier.

Other objects, features and advantages of the present invention will be readily apparent from the following detailed description of a preferred embodiment thereof, taken in conjunction with the accompanying drawings, in which:

FIGURE 1 is a top plan view of a bottle carrier embodying features of the invention;

FIGURE 2 is a side elevational view partially broken away and in section of the carrier and taken substantially along the line II—II of FIGURE 1;

FIGURE 3 is a fragmentary top plan view taken substantially in the plane of line III—III on FIGURE 2 and showing configuration of the upper opening into the socket for receiving the interlock portion of the assembled handle leg;

FIGURE 4 is a fragmentary sectional elevational detail view showing a step in the assembling of the attachable handle with the carrier; and FIGURE 5 is an end elevational view, partially in section taken substantially on the line V—V of FIGURE 1.

In the embodiment of the invention selected for illustration, a carrier is provided for handling eighteen crown-capped bottles of the six to ten ounce variety. This carrier is especially suitable for handling refrigerated or unrefrigerated bottled beverages in supplying the self-service trade. For this purpose, the carrier is constructed in as compact dimensions, especially as to length and width as may reasonably be accomplished in a molded tray unit capable of supporting maximum number of bottles in a balanced, efficient arrangement.

This carrier lends itself especially well to one-shot molding in dies consisting of but two opposed complementary die sections free from any need for slides or inserts insofar as structural features are concerned. All generally vertical surfaces of the carrier structure are fully oriented for shaping by corresponding die surfaces of either the upper or the bottom forming die section, with ample though minimum draft for ready separation of the rigidified molded carrier member from the dies. All wall areas and partitions or dividers of this carrier lend themselves to minimum shell wall section thicknesses. Plastic material on the order of high density polyethylene is contemplated in the molded, substantially rigid, self-sustaining structure, and that is intended to be the connotation of the term "plastic" as used herein.

On reference to the drawings, the carrier comprises, primarily, a bottle-carrying tray including a base or bottom wall structure 10 and an outer vertical wall comprising opposite spaced, similar and coextensive side wall portions 11, and similar, coextensive opposite end wall portions 12. Integral, one-piece juncture of the base wall structure with the side wall and end wall portions is on rounded respective juncture ribs 13. The side and end wall portions 11 and 12 are of the same height and with the bottom wall structure 10 define a tray area of as shallow a depth as practical, having due regard to such considerations as stability of support for bottles carried therein, supportive strength and resistance to handling deformations of the carrier, and the like. On their upper ends, the side wall portions have respective continuous integral outwardly projecting reinforcing and buffer ribs 14 which extend at least partially onto and along the upper margins of the end wall portions 12.

Within the tray-like receptacle area defined by the outer wall structure of the carrier, a set of the desired number of upwardly opening, individual bottle-receiving cells 15 is provided comprising an advantageous array to afford eighteen such cells, i.e., two longitudinally extending adjacent inner rows of four cells and two longitudinal outer rows of five cells.

Dividing the two inner rows of cells 15 is a straight longitudinally extending divider 17. Between the cells 15 of each row and between the cells of the inner and outer rows are web-like divider partitions 18. In the inner two rows of the bottle cells 15, the dividers 18 which separate the cells one from another integrally join the center partition 17 which forms the inner boundary of the inner cells. In respect to the two outer rows of the cells 15, the dividers 18 therebetween integrally join the side wall portions 11 which serve as the outer boundaries of the outer cells. Between the contiguous inner and outer rows of cells, which are in generally honeycomb-cell staggered relation, the dividers 18 are in a generally zig-zag uniform pattern, with the endmost of the dividers 18 integrally joining the end wall portions 12 which serve as boundaries for the endmost cells. This provides a generally five-sided plan configuration for each of the individual cells 15. All of the divider partitions 18 are, of course, integral with the bottom wall 10. Desirably all of the partitions 17 and 18 and the upstanding wall portions 11 and 12 extend upwardly to a common horizontal plane, and this enables one of the carrier trays to be supported on the other empty stacking.

To afford frictional surface for minimizing undesirable slippage on a supporting surface, a substantial aggregate area of the underface of the base or bottom wall 10 lies in a common supporting plane. To afford reinforcement for the bottom wall against sagging under the weight of bottles in the cell areas as well as to effect a reinforcing tie-in of the base wall cell areas, and to afford downwardly opening registration pockets for the crowns of bottle caps for loaded stacking of the carrier, an advantageous pattern of elevated reinforcing ribs and bottle cap accommodating socket areas is provided on the base wall. To this end, each of the base wall areas in each of the cells 15 has a central upwardly offset, preferably circular portion 19, connected with the normal plane of the base wall by means of a reinforcing offset tapered generally annular flange 20. This affords in the bottom of each of the cells a downwardly opening shallow pocket or socket recess 21 (FIG. 5) nestably receptive of the crown of a bottle cap when the carrier is stacked on a similar bottle-filled carrier. Thereby, freedom from accidental sliding displacement of the stacked carrier from the tops of the supporting bottles is attained.

For further reinforcement of the base wall areas within the respective cells, a pattern of raised shallow radiating reinforcing ribs 22 is provided extending symmetrically from the raised offset area portions 19, and desirably in the same top plane so as to provide uniform support for the bottom ends of bottles. The reinforcing ribs 22 extend integrally through and in reinforcing relation to the dividers 17 and 18. Those of the reinforcing ribs 22 which terminate at the outer wall portions 11 and 12 run into and blend with such wall portions in reinforcing relation. Desirably, the ribs 22 are downwardly hollow for savings in material and weight. As best seen in FIGURE 1, the reinforcing ribs 22 afford an over-all pattern of reinforcement along longitudinal and crossing diagonally extending transverse lines.

To facilitate washing and cleaning the tray, those areas of the bottom wall 10 which underlie the junctures of the divider webs 18 with one another are provided with substantial drainage holes 23 (FIGS. 1 & 5), and the partition junctures are open as upward extensions 24 of such holes, with the upper portions of the junctures coming together in thickened juncture bars 25 which reinforce the same against any tendency toward buckling under vertical loads.

These openings also facilitate refrigerated air circulation. In those depressed areas of the bottom wall 10 which are not drained by the openings 23, respective drainage openings 27 are provided.

For convenience in manipulating the carrier, integral handle means are provided thereon comprising a handle 28 at least on one end, and preferably on both ends. In a desirable construction, each of the handles 28 comprises a thickened bar of substantial width vertically, having its upper edge in a plane with the top edge of the associated end wall portion 12. At its opposite ends, the handle bar 28 is integral with generally semi-cylindrical bounding end wall areas defining the endmost outer row cells 15 flanking a clearance indentation 29 in the end wall 12 and providing the end wall boundaries of the end cells of the inner two rows. This affords a handle bar 28 of substantial length enabling ready full hand grasping either from below or from above. Along its lower edge the handle bar has an inturned reinforcing flange 30 which at its opposite ends joins vertical reinforcing flanges 31, integral with a respective horizontal reinforcing web 32 joining the adjacent end portion of the handle bar 28 and the contiguous portions of the end wall 12. This affords a rugged end handle for conveniently pulling, carrying and general manipulation of the carrier.

Although by provision of the handles 28 at the opposite ends of the carrier, manipulation of the carrier is conveniently provided for, a central manipulating and more particularly lifting handle 33 may be provided. In a desirable form, the handle 33 is constructed to provide an optional attachment to the carrier. To this end, the handle 33 is of a generally inverted U-shape in side elevation and includes a horizontal longitudinal hand grip or handle bar 34 of upwardly opening U-shape in cross-section, with its undersurface rounded for comfortable gripping. At each end, the handle bar 34 is integrally united with a respective end riser strut or leg 35 which may diverge slightly at a high pitch inclination. Cross-sectionally, the legs 35 are of generally U-shape structure with the hollow side opening inwardly and generally downwardly and defined by spaced side wall flanges 37. This affords a handle structure which is readily separately molded on a mass production basis.

Means are provided for ready assembly of the handle 33 with the carrier tray structure by a simple push-in manipulation of the handle whereby it is snappingly interlocked against unintentional separation. Accordingly, each of the handle legs 35 has the lower end portion thereof constructed to provide a downwardly extending interlock finger 38 which although directed substantially vertically continues the generally U-shape cross-section of the upper portion of the handle leg. At its lower extremity, each of the fingers 38 has an interlock projection 39 which extends endwardly relative to the handle from the vertical endwardly facing web portion of the finger and provides an upwardly facing detent shoulder.

To receive the respective interlock fingers 38, the central longitudinal divider 17 is constructed as an upstanding hollow rib having a preferably flat top wall 40 provided with respective finger-receiving upwardly opening socket apertures 41 (FIGS. 2, 3 & 4) substantially complementary in outline to the respective fingers to be received therein and equally spaced from the longitudinal center of the divider rib 17. As best seen in FIGURE 5, the hollow divider rib 17 desirably comprises a substantially upwardly projecting and downwardly opening extension of the base wall 10 and supporting the top wall 40 of the divider rib on spaced side walls 42 with which the dividers 18 are integrally joined for mutual reinforcement. More especially, it will be observed in FIGURES 1 and 3, that certain of the dividers 18 are integral with the side walls 42 and with the portions of the top wall 40 adjacent to the handle sockets 41 whereby to afford excellent reinforcement for the local areas of maximum lifting load imposition in the center divider and handle carrying structure.

Within and aligned with the socket openings 41, the respective interlock fingers 38 of the handle are received in a manner not only to retain the fingers in positive interlocked relation but also to afford firm, handle-stabilizing engagement of the fingers so that after assembly of the handle with the carrier there is substantially a unitary, functionally integral relationship of the handle 33 and the carrier tray structure. To this end, the interlock fingers 38 are of substantial length, such as half as long as the height of the handle 33 above juncture of the fingers with the handle legs 35. Within the sockets 41, the interlock fingers 38 are in intimate engagement with opposing surfaces provided by the hollow divider rib 17, including engagement of the finger extension portions of the side flanges 37 with the inner faces of the side walls 42 of the divider rib. Engagement of the web portions of the interlock fingers 38 is with respective transverse integral flange webs 43 joined to the divider rib side walls 42 and aligned with the boundaries of the socket openings 41 nearest the ends of the carrier. Each of the web flanges 43 has an interlock offset 44 providing a downwardly facing shoulder with which the shoulder of the interlock lug projection 39 of the associated handle finger 38 interlockingly engages.

Cooperating with the interlock shoulder projection 39 to maintain interlockingly interengagement thereof with the interlock shoulder 44, are identical, operatively aligned, downwardly facing stop shoulders 45 provided on the side flanges 37 of the handle legs at juncture with the interlock finger 38 in each instance. These stop shoulders 45 engage with the upwardly facing shoulder surfaces afforded by the top wall 40 at the inner ends of the respective socket openings 41. Thereby, the stop shoulders 45 define the interlocked, operative position of the handle 33 above the top wall 40, and the interlock projections 39 positively retain the handle against unintentional separation. Further, the load of the carrier is transmitted to the handle by the respective shoulders 44 to the lugs or projections 39 interlocked therewith. Any tendency of the respective interlock fingers 38 to yield under load away from the interlock shoulders 44 is thoroughly resisted by the associated side flange portions on the fingers serving as trusses. Any tendency for the handle side flanges 37 to buckle or flex toward one another under unusual stress or pressure is resisted by an intervening stabilizer tongue 47 extending therebetween as an integral part of the top wall 40 and defining in the top wall respective notch recesses 48 as part of the associated socket opening 41 to receive the side flanges 37. Substantial reinforcement against any distorting forces on the tongue 47 or on the shoulder portions of the top wall 40 aligned with the notches 48 and on which the shoulders 45 of the handle engage is afforded by an integral downwardly extending reinforcing flange 49 aligned with such shoulders and integral with the top wall 40 and the side walls 42 and completing a vertical tubular enclosure for the socket 41 opening downwardly as well as upwardly.

In order to facilitate assembly of the interlock fingers 38 into the socket, the interlock finger portions of the side flanges 37 of the handle legs are provided with longitudinal edge clearance insets 50 extending downwardly from an oblique cam surface 51 adjacently below the respective stop shoulders 45 and afforded with a lower oblique lead-in cam surface 52. Through this arrangement, on starting the interlock fingers 38 into the respective sockets 41, a slight springing of the handle legs 35 toward one another eases the interlock lugs 39 down into the socket along the abutment web wall flange 43. This action is facilitated by providing on the abutment web opposing surface of the respective interlock lugs a lead-in cam surface 53. The handle is then advanced downwardly into assembled position, with the interlock lugs 39 riding on the vertical surface of the web flange 43 as shown in FIGURE 4 and as permitted by the clearance inset 50 on each of the associated side flanges 37. As the interlock lug 39 approaches the interlock shoulder 44, the edge cam surfaces 51 cam the upper portions of the interlock fingers 38 toward the abutment wall flange 43 and develop a substantial spring loading of the fingers so that when the fully assembled relationship of the handle as defined by the stop shoulders 45 is reached, the interlock lugs 39 will snap into and remain in positive interlocked relation with the interlock shoulders 44. Should it ever be desired to remove the handle 33, as for replacement should it become damaged, a tool may be inserted between the interlock lug 39 and the adjacent portion of the web 43 below the interlock shoulder 44 and the interlock lug 39 sprung free of the interlock shoulder so that the associated handle leg may be pulled free. However, due to the substantial stiffness of the elastic material from which the handle and the tray portion of the carrier are made such release of the handle will not be easy.

By having the handle 33 complementally narrower at its base than the width of the space between the side walls 42 of the center divider 17 at the lower opening, and tapering upwardly both at its sides and at its ends, and by having the height of the handle less than the height of the carrier tray, reception of the handle within the hollow space afforded in the rib divider 17 of a superimposed empty carrier is enabled for stacking the carriers. Through this arrangement, also, the handle serves as a stacking registration device for empty carriers.

For convenience in molding the carrier, the top wall 40 extends longitudinally only between the handle abutment and interlock shoulder web flanges 43, while the extent of the center divider 17 between each of the webs 43 and the adjacent inset portion 29 of the respective end wall 12 opens upwardly between the hollow divider side walls 42, with the base wall 10 closing the lower ends of respective auxiliary pockets 54 thereby provided, with drainage holes 55 provided in the pocket bottoms. These pockets 55, which are about as wide as the handle 33, may conveniently be used as receptacles to receive articles on the order of bottle openers, advertising literature, sipping straws, and the like.

It will be understood that modifications and variations may be effected without departing from the spirit and scope of the novel concepts of the present invention.

I claim as my invention:

1. A molded plastic bottle-carrier of the character described comprising:
    (a) base and upstanding wall structures defining a carrying tray having side and end wall portions, and integral dividers subdividing the tray into an array of longitudinal rows of upwardly opening cells including two inner rows along the longitudinal center of the tray and two outer rows having common boundaries with the respective inner rows and bounded by the side wall portions, the cells in the inner rows being staggered with relation to the cells of the outer rows and with the end cells of both of the outer rows at one end of the tray projecting endwise beyond the contiguous end cells of the inner rows, the adjacent end wall portion bounding all of the end cells and being indented between said outer row end cells;
    (b) and a handle bar integral with the end wall areas bounding said outer row end cells and spaced from the indented portion of the end wall and defining a hand hole therewith.

2. A molded plastic bottle-carrier of the character described comprising:
    (a) base and upstanding wall structures defining a carrying tray having side and end wall portions, and integral dividers subdividing the tray into an array of longitudinal rows of upwardly opening cells including two inner rows along the longitudinal center of the tray and two outer rows having common boundaries with the respective inner rows and bounded by the side wall portions, the cells in the inner rows being staggered with relation to the cells of the outer rows and with the end cells of both of the outer rows at one end of the tray projecting endwise beyond the contiguous end cells of the inner rows, the adjacent end wall portion bounding all of the end cells and being indented between said outer row end cells;

(b) a handle bar integral with the end wall areas bounding said outer row end cells and spaced from the indented portion of the end wall and defining a hand hole therewith;

(c) and respective reinforcing flanges connecting the opposite end portions of the handle bar with the end wall adjacent to said inner row end cells.

3. A one-piece molded plastic bottle-carrier of the character described comprising:

(a) base wall and outer walls upstanding form the base wall and defining a carrying tray including side walls and end walls, said end walls being centrally inset;

(b) a respective horizontal handle bar integral at its ends with the endmost portions of the end walls, in outwardly spaced relation to said inset portions and defining with said inset portions central upwardly opening hand holes;

(c) and dividers integral with said walls subdividing the tray area defined by the walls into an array of upwardly opening bottle-receiving cells.

4. A one-piece molded plastic bottle-carrier comprising:

(a) a base wall, side walls, and end walls joined to said side walls;

(b) a longitudinally extending center divider and divider webs integral with said center divider defining with said center divider and said end walls two coextensive longitudinally extending inner rows of four upwardly opening bottle-receiving cells each in which the cells of each row are aligned with the corresponding cells of the other row on respective lines perpendicular to the longitudinal axis of the center divider, and additional dividers defining with said two inner rows of cells and with said end walls and side walls two coextensive outer rows of five upwardly opening bottle-receiving cells each in staggered relation with respect to said inner rows but aligned with the corresponding cells of the other outer row on respective lines perpendicular to said center divider and with a zig-zag boundary row of divider webs between each of the outer rows and the respective contiguous inner rows, said end walls defining the boundaries of the endmost cells of all of the rows and being inset where such end walls bound the endmost cells of the inner rows;

(c) and a respective handle bar extending horizontally across each of the insets in spaced relation to the inset portions of said end walls and having their opposite ends integral with the portions of the end walls which bound the end most cells of the outer rows.

5. A one-piece molded plastic bottle-carrier of the character described comprising:

(a) a base wall and upstanding outer walls defining a carrying tray;

(b) and dividers integral with said walls and subdividing the carrying tray into an array of upwardly opening bottle-receiving cells, said dividers including an elongated hollow divider having its opposite ends integral with opposite walls of the tray and including spaced parallel upstanding walls having a top wall connecting the same throughout a substantial extent of the divider side walls to define a hollow space opening downwardly through the base wall, the remaining extent of said divider being open upwardly between said divider side walls and closed along the bottom by said base wall.

6. A molded plastic bottle-carrier of the character described comprising:

(a) a base wall and upstanding outer walls defining a carrying tray;

(b) dividers integral with said walls and subdividing the carrying tray into an array of upwardly opening bottle-receiving cells, said dividers including an elongated hollow divider having its opposite ends integral with opposite walls of the tray and including spaced parallel upstanding walls having a top wall connecting the same throughout a substantial extent of the divider side walls to define a hollow space opening downwardly through the base wall, the remaining extent of said divider being open upwardly between said divider side walls and closed along the bottom by said base wall and defining a utility receptacle;

(c) and a handle clear of said receptacle and having legs extending up from said top wall and a handle bar joined to said legs and overlying said top wall.

7. A molded plastic carrier of the character described comprising:

(a) means defining a carrying tray having a central upstanding hollow downwardly opening rib structure provided with spaced apart handle leg receiving sockets having downwardly facing detent shoulder means, and upwardly facing surface on top of said rib structure contiguous to said sockets;

(b) and a handle having a handle bar and downwardly extending legs including detent fingers engaging in said sockets and having detent lugs facing upwardly and interengaging with said detent shoulder means, downwardly facing shoulders on said handle legs engaging said surface whereby to secure the handle in place against displacement in any direction relative to said rib structure, the handle being of less height than said rib structure and receptive within the hollow space of the upstanding hollow rib of a similar carrier nested thereover and resting on said tray.

8. A molded plastic carrier of the character described comprising:

(a) a carrier member including means defining spaced upwardly opening sockets;

(b) a handle having legs including stabilizing fingers inserted in said sockets;

(c) and means retaining said fingers in said sockets against either upward or downward movement and including a downwardly facing shoulder on each of said legs adjacent to the respective finger and an upwardly facing shoulder on said means adjacent to the associated socket engaged by said finger shoulder, and a detent lug on each of the fingers providing an upwardly facing shoulder spaced below said downwardly facing shoulder and engaging a respective downwardly facing detent shoulder on said means below said upwardly facing shoulder thereon.

9. A molded plastic bottle carrier of the character described comprising:

(a) bottom and outer walls defining a tray area, and said outer walls having inset portions at opposite ends of the tray area and in alignment with the longitudinal center of such area;

(b) a longitudinal center hollow divider rib on said bottom wall and connected at its ends to said inset portions;

(c) respective handle bars connected at their ends to said outer walls across and in spaced relation to said inset portions and defining hand holes therewith;

(d) an upstanding handle having legs attached to said center divider rib;

(e) and divider web partitions subdividing the tray areas bounded by said walls and said center divider rib into an array of upwardly opening bottle-receiving cells, with certain of said partitions joining said center divider rib reinforcingly adjacent to attachment thereto of said handle legs.

10. A molded plastic bottle-carrier of the character described comprising:
   (a) base and upstanding wall structures defining a carrying tray;
   (b) dividers integral with said walls dividing the tray into an array of upwardly opening bottle-receiving cells;
   (c) an upwardly extending handle having a handle bar and downwardly extending legs thereon;
   (d) one of said dividers longer than said handle extending centrally across said tray and having said handle legs attached to and spaced substantially from the opposite ends of said one divider; and
   (e) said one divider being hollow and opening upwardly outwardly beyond the handle legs whereby to define auxiliary receptacle pockets about as wide as the handle.

11. A molded plastic carrier of the character described comprising:
   (a) means defining a carrying tray having a central upstanding elongated hollow downwardly opening rib structure provided adjacent to its opposite ends with spaced apart respective handle leg receiving sockets opening upwardly for optional attachment of a handle to the carrier;
   (b) and a handle having an elongated handle bar and downwardly extending legs at the respective ends of the handle bar and including lower end portions receptive in said sockets and having means thereon interlockingly interengageable with surfaces contiguous to the sockets to retain the handle substantially permanently when assembled with the tray, the handle being dimensioned to be received within the hollow downwardly opening space within the rib structure of a superimposed like carrier resting on the tray and the handle serving as a stacking registration device for the superimposed carrier.

12. A molded plastic carrier of the character described comprising:
   (a) a base wall and outer walls upstanding therefrom and defining a carrying tray area having thereon an upstanding hollow rib structure including spaced side walls and respective pairs of spaced web flanges integrally connected to and between said side walls adjacent to the opposite ends of the rib structure and defining respective upwardly opening handle leg-receiving sockets, one of said web flanges of each pair having a downwardly facing interlock shoulder;
   (b) and a handle having legs including attachment and stabilizing end portions respectively inserted in said sockets and each including an upwardly facing interlock engaged with the respective interlock shoulder of said one flange of the socket with which associated and having an opposite portion thrusting against the respective opposite web flange of the socket to maintain interlocked relationship of the interlock with said shoulder in each instance, and the handle being dimensioned to be received within the hollow rib structure of a like carrier stacked in superimposed relationship upon the carrier and the handle thus serving as a stacking registration device.

13. In a molded plastic carrier of the character described:
   (a) means defining spaced apart upwardly opening handle-receiving sockets each defined by opposed walls;
   (b) a handle including a handle grip portion and coextensive legs on the respective opposite ends of the handle grip portion each of substantially U-shape cross section defining a channel opening toward the channel of the opposite leg and defined by an outer web and side flanges which have the edges thereof facing toward the edges of the side flanges of the opposite leg, the free end portions of said legs being engageable within the respective sockets with said web portions engaging respective walls of the sockets and the edges of the side flanges engaging opposed walls of the sockets and thrusting said webs against the socket walls engaged by the web; and
   (c) interlock shoulder structure on said webs and said side flanges and on said means providing said sockets and securing the legs against longitudinal displacement within said sockets.

14. In a molded plastic carrier of the character described:
   (a) means providing spaced apart upwardly opening sockets each defined by opposed walls;
   (b) a handle having spaced apart legs each of generally U-shape cross-section provided with a web portion and spaced side flanges and each leg having a terminal stabilizing finger of substantial length and receivable in one of said sockets with said side flanges engaging opposed walls defining the respective socket and said webs and the edges of the side flanges engaging other opposed walls of the respective sockets, whereby the handle is maintained in a stable relation to the carrier;
   (c) interlock shoulder structure on said fingers and on said sockets securing the handle against separation from the carrier;
   (d) and tongue structure on the socket means extending in stabilizing relation between said side flanges of the handle legs and preventing collapse of said side flanges toward one another.

References Cited by the Examiner

UNITED STATES PATENTS

| | | |
|---|---|---|
| D. 148,488 | 1/1948 | Shank. |
| D. 150,031 | 6/1948 | Richards. |
| D. 171,132 | 12/1953 | Hudson. |
| 2,365,914 | 12/1944 | Stigler _____ 220—107 |
| 2,535,493 | 12/1950 | Gerber. |
| 2,821,327 | 1/1958 | Glazer _____ 220—102 |
| 2,826,332 | 3/1958 | Hudson _____ 220—104 X |
| 3,055,542 | 9/1962 | Russo _____ 220—104 |
| 3,055,543 | 9/1962 | Russo _____ 220—116 |
| 3,114,472 | 12/1963 | Russo _____ 220—104 |
| 3,148,797 | 9/1964 | Cloyd. |

GEORGE O. RALSTON, *Primary Examiner.*